United States Patent [19]
Medovar et al.

[11] 3,832,476
[45] Aug. 27, 1974

[54] ELECTROSLAG MELTING OF INGOTS

[76] Inventors: Boris Izrailevich Medovar, ulitsa A. Barbju-sa, 22/26, kv. 109; Valery Evgenievich Lanevsky, ulitsa V. Kuchera 2, kv. 8; Jury Fedorovich Alferov, bulvar Lepse, 29, kv. 64; Rudolf Solomonovich Dubinsky, ulitsa Politekhnicheskaya, 5, kv. 209; Mikhail Elevich Berezovsky, ulitsa Lomonosova, 21/14, kv. 54; Leonty Vasilievich Chekotilo, ulitsa A. Barbjusa 22/26, kv. 64; Leonid Viktorovich Pavlov, ulitsa Borschagevskaya, 234, kv. 6, all of Kiev; Veniamin Alexandrovich Ishunkin, ulitsa Tolbukhina, 7, kv. 142, Moscow; Anatoly Ivanovich Shevtsov, ulitsa Vorovskgo 5, kv. 9; Semen Yakovlevich Grinshpon, ulitsa Butova 128, kv. 37, both of Kulebaki Gorkovskoi oblasti, all of U.S.S.R.

[22] Filed: Dec. 6, 1973

[21] Appl. No.: 422,159

[52] U.S. Cl. ............................ 13/15, 13/16
[51] Int. Cl. ............................ H05b 7/10
[58] Field of Search .................. 13/14–17; 219/76

[56] References Cited
UNITED STATES PATENTS

| | | | |
|---|---|---|---|
| 881,519 | 3/1908 | Wilson | 13/16 X |
| 2,931,886 | 4/1960 | Nunnelee et al | 219/76 |
| 3,379,238 | 4/1968 | Sieckman | 13/14 UX |
| 3,602,623 | 8/1971 | Wooding | 13/14 |

*Primary Examiner*—Roy N. Envall, Jr.
*Attorney, Agent, or Firm*—Holman & Stern

[57] ABSTRACT

An installation for the electroslag melting of ingots comprising a column with a carriage secured thereon to carry an electrode holder with consumable electrodes to be melted in a cooled mould mounted on a bottom plate. The electrode holder has a standard head formed as a plate with holes for securing the consumable electrodes therein. The holes of the plate that have electric insulation are alternated with the holes lacking insulation.

1 Claim, 4 Drawing Figures

ELECTROSLAG MELTING OF INGOTS

BACKGROUND OF THE INVENTION

An installation is known in the art for the electroslag melting of ingots, comprising a column whereon an electrode holder is secured by means of a vertically movable carriage. This installation has a cooled mould with a space therein for melting consumable electrodes. Prior to the process, the cooled mould is placed on a bottom plate which overlaps the mould space from below.

The electrode holder has contact plates insulated from the casing of the electrode holder and connected to one of the poles of the power source. The other pole is connected to the bottom plate.

The electrode holder is adapted to hold one electrode and to receive current supplied through the contact plates.

However, on the above installation for melting two or more consumable electrodes connected in parallel in the circuit (single-phase circuit), it is necessary to change the electrode holder adjusted to hold one electrode, to an electrode holder adapted to hold two or more consumable electrodes and to receive current from a power source.

Changing the electrode is a laborious time consuming operation.

Attempts have been made to design an installation permitting the simultaneous single-phase operation of several electrodes. This showed the necessity of providing an electrode holder of sophisticated design, which could hold two or more electrodes with individual clips for each of them.

SUMMARY OF THE INVENTION

The primary object of the invention is to provide an installation for the electroslag melting of ingots, having a higher efficiency, compared with known plants.

Another object of no less importance is to ensure a reduction in the electric power consumed to melt consumable electrodes in the installation.

A further object of the invention is to secure precise fixation of several consumable electrodes in the melting space and conveniency of maintenance while assemblying the electrodes on a separate stand.

These and other objects are achieved by providing an installation for the electroslag melting of ingots, comprising a column with an electrode holder secured thereon by means of a vertically movable carriage to carry consumable electrodes being melted in the space of the cooled mould mounted on a bottom plate, and an electric power source connected to the electrode holder and bottom plate, wherein, according to the invention, there is a standard head in the electrode holder, formed as a plate with holes for securing consumable electrodes therein, the holes having electric insulation alternating with the holes lacking such.

The installation with an electrode holder having the above described standard head has higher efficiency and economy, compared with known installations, since it ensures the melting of the consumable electrodes not connected to the power source but spaced between the consumable electrodes connected to the power source.

BRIEF DESCRIPTION OF THE DRAWINGS

The invention will be more apparent from the description of any exemplary embodiment with reference to appended drawings, wherein.

DETAILED DESCRIPTION OF PREFERRED EMBODIMENTS

Figure 1:
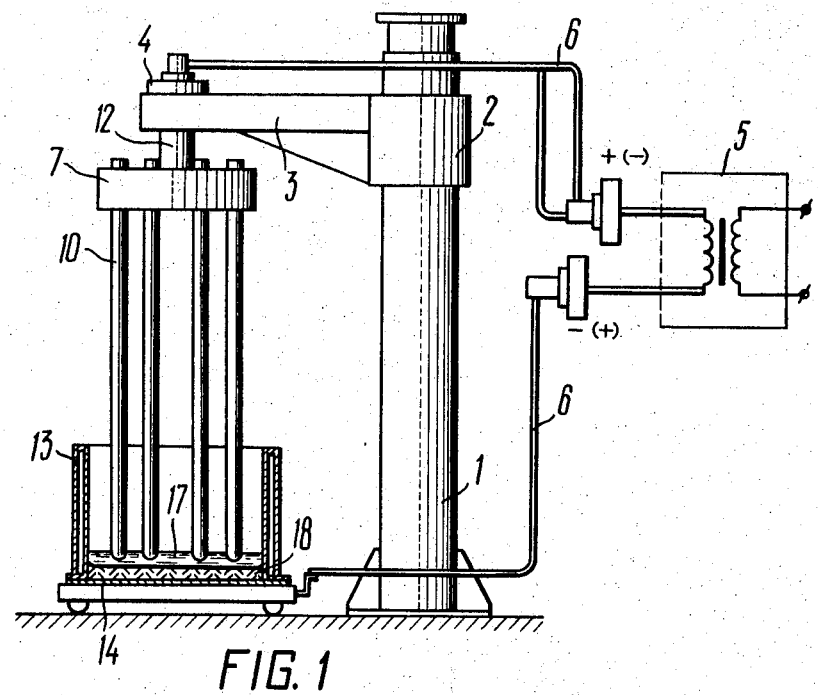
FIG. 1 shows a lateral view with a partial cut-away section of an installation according to the invention.
Figure 2:
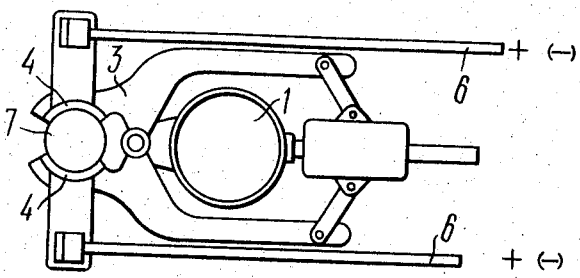
FIG. 2 is the plan view of the same installation.

The installation for the electroslag melting of ingots according to the invention has a column 1 (FIG. 1) with an electrode holder 3 secured thereon by means of carriage 2, the electrode holder 3 being fitted with contact plates 4 connected to an electric power source 5 with the aid of current-conducting cables 6.

Figure 3:
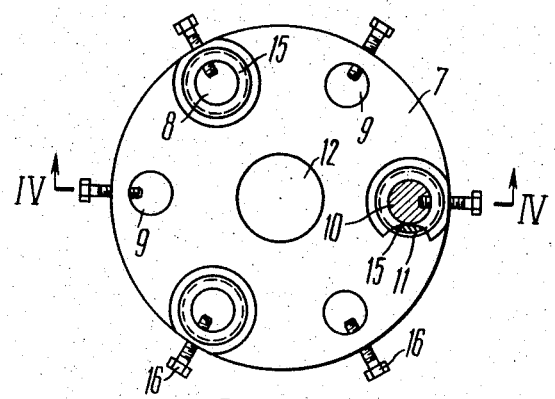
FIG. 3 is a sealed-up plan view of an inventory head (scaled up)
Figure 4:
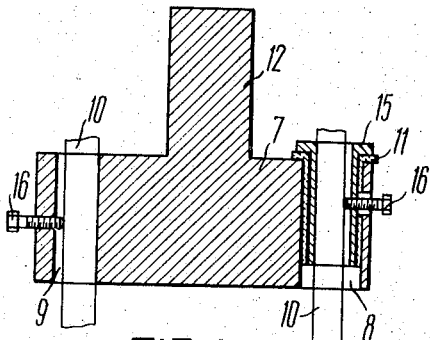
FIG. 4 is a section IV–IV as in FIG. 3.

The electrode holder 3 holds a standard head 7 (FIGS. 1–4) formed as a plate with holes 8 and 9 (FIGS. 3 and 4) for the fixation therein of consumable electrodes 10. The holes 8 with electric insulation 11 (FIG. 4) are intended for accommodating the consumable electrodes 10 not connected to the power source 5, while the holes 9 which do not have insulation accommodate the consumable electrodes 10 connected to the power source. These holes are alternated so that the consumable electrodes 10 not connected to the power source 5 (FIG. 1) are arranged between the consumable electrodes 10 connected to the power source 5.

The standard head 7 has a pin 12 which enables it to be held by the electrode holder 3.

Such an arrangement of the standard head 7 in the electrode holder 3 permits quick changing thereof and placing therein of the consumable electrodes 10 each on an individual stand.

A cooled mould 13 is provided in a bottom plate 14 for melting consumable electrodes 10.

The electrode holder 3 and the bottom plate 14 are connected to the electric power source 5.

The consumable electrodes 10 not connected to the power source 5 are inserted into electrically insulated hubs 15 (FIGS. 3 and 4) and fastened by bolts 16. The consumable electrodes 10 connected to the power source 5 are inserted directly into the holes 9 of the standard head 7 and also secured with bolts 16.

The installation operates as follows.

The cooled mould 13 (FIG. 1) is mounted on the bottom plate 14. The consumable electrodes 10 are secured in the standard head 7 which is held by the electrode holder 3 on the carriage 2. The consumable electrodes 10 are introduced into the space of the cooled mould 13 to a preset depth. Slag is then poured into the space of the mould 13 until the lower ends of the electrodes 10 are submerged, and electric power is supplied to the consumable electrodes 10. With current passing through the slag 17, heat energy is released due to the resistance of the slag to electric current, and the melting of consumable electrodes 10 takes place. From the melting metal of the consumable electrodes 10, an ingot 18 is melted.

The consumable electrodes 10 not connected to the power source 5 but spaced between the consumable electrodes 10 connected to the power source 5 lie within the zone of intensive heat release and also melt.

What is claimed is:

1. An installation for the electroslag melting of ingots, comprising: a column; a vertically movable carriage mounted on said column; an electrode holder coupled to said carriage and movable therewith; a standard head mounted in said electrode holder, said head comprising a plate having a plurality of substantially circularly disposed through holes for accommodating consumable electrodes to be melted, alternating ones of said holes being provided with electric insulation for insulating the consumable electrodes mounted therein from said electrode holder; a cooled mould having a space for melting said consumable electrodes; a bottom plate mounted under said mould; an electric power source connected across said electrode holder and said bottom plate for melting said consumable electrodes.

* * * * *